US006993831B2

(12) United States Patent
Vrana

(10) Patent No.: US 6,993,831 B2
(45) Date of Patent: Feb. 7, 2006

(54) FASTENER INSTALLATION APPARATUS

(75) Inventor: John J. Vrana, Rochester Hills, MI (US)

(73) Assignee: Whitesell International Corporation, Taylor, MI (US)

( * ) Notice: Subject to any disclaimer, the term of this patent is extended or adjusted under 35 U.S.C. 154(b) by 0 days.

(21) Appl. No.: 10/802,651

(22) Filed: Mar. 16, 2004

(65) Prior Publication Data
US 2005/0204549 A1    Sep. 22, 2005

(51) Int. Cl.
B23Q 21/00    (2006.01)
(52) U.S. Cl. .......................... 29/716; 29/798; 29/432.2
(58) Field of Classification Search .............. 29/432.1, 29/432.2, 434, 436, 465, 243.5, 243.53, 243.517, 29/509, 715, 716, 798, 525.01, 525.05, 525.06, 29/525.08; 227/110, 111, 56
See application file for complete search history.

(56) References Cited

U.S. PATENT DOCUMENTS

| 2,649,125 | A | * | 8/1953 | Poupitch ..................... 411/165 |
| 2,750,660 | A | | 6/1956 | Newcomb |
| 3,152,628 | A | | 10/1964 | Strain et al. |
| 3,648,747 | A | | 3/1972 | Wennberg |
| 3,837,069 | A | * | 9/1974 | Nordgren ................... 29/432.1 |
| 3,845,860 | A | | 11/1974 | Ladouceur et al. |
| 3,851,373 | A | * | 12/1974 | Shinjo ........................ 29/432.2 |
| 4,164,072 | A | * | 8/1979 | Shinjo ........................... 29/798 |
| 4,442,584 | A | | 4/1984 | Smallegan |
| 4,505,416 | A | * | 3/1985 | Smallegan .................... 29/798 |
| 4,507,859 | A | * | 4/1985 | Shinjo ........................ 29/432.1 |
| 4,574,473 | A | * | 3/1986 | Sawdon ........................ 29/798 |
| 4,700,470 | A | * | 10/1987 | Muller .......................... 29/798 |
| 4,785,529 | A | * | 11/1988 | Pamer et al. ................. 29/798 |
| 4,998,659 | A | * | 3/1991 | Goodsmith et al. ......... 227/119 |
| 5,042,518 | A | | 8/1991 | Singhe et al. |
| 5,072,518 | A | * | 12/1991 | Scott ........................... 29/798 |
| 5,360,137 | A | * | 11/1994 | Shinjo et al. ............... 221/238 |
| 5,566,446 | A | * | 10/1996 | Luckhardt et al. ............ 29/798 |
| 5,657,536 | A | * | 8/1997 | Shinjo ......................... 29/798 |
| 5,743,003 | A | * | 4/1998 | Shinjo ......................... 29/798 |
| 6,266,871 | B1 | * | 7/2001 | Edwards ................. 29/243.53 |
| 6,442,830 | B1 | | 9/2002 | Vrana |
| 6,446,833 | B1 | * | 9/2002 | Morishima et al. .......... 29/798 |
| 6,526,650 | B2 | * | 3/2003 | Gaskin ........................ 29/715 |
| 2002/0095781 | A1 | * | 7/2002 | Schmidt ...................... 29/798 |

OTHER PUBLICATIONS

PCT/US04/37438 International Search Report dated Jun. 29, 2005.

* cited by examiner

Primary Examiner—David P. Bryant
(74) Attorney, Agent, or Firm—Howard & Howard

(57) ABSTRACT

The disclosed fastener installation apparatus includes a plurality of spaced parallel feed passages each communicating with a plunger passage in a moveable member and the fixed member includes a plunger assembly having a plurality of spaced parallel legs which reciprocate through the plunger passages to simultaneously install a plurality of fasteners in a panel opposite the plunger passage. In one embodiment, the plunger assembly includes a body portion fixed to the fixed member and a plurality of integral parallel legs and a second embodiment having a plurality of separate spaced parallel plungers. Each plunger passage includes a proximity probe having an end adjacent to, but spaced from the plunger passage eliminating wear or damage to the proximity probes during use.

15 Claims, 6 Drawing Sheets

FASTENER INSTALLATION APPARATUS

FIELD OF THE INVENTION

This invention relates to fastener installation apparatus for installing self-attaching fasteners, including pierce and clinch nuts particularly, but not exclusively, for applications in a confined space where a conventional fastener installation apparatus cannot be used.

BACKGROUND OF THE INVENTION

Fastener installation apparatus for installing self-attaching fasteners in mass production applications, such as automotive applications, typically include a fastener installation head which includes a reciprocating plunger for installing a self-attaching fastener in a panel opposite the plunger passage, and a die member or die button which supports the panel and deforms the panel into a recess provided in the fastener, permanently installing the fastener in the panel. There are several types of self-attaching fasteners, including pierce and clinch nuts as disclosed, for example, in U.S. Pat. No. 3,648,747, assigned to the assignee of the predecessor in interest of this application. The pierce nut disclosed in this patent includes a rectangular pilot which pierces an opening in the panel and flange portions on opposed sides of the pilot having panel bearing faces and dovetail-shaped or "re-entrant" grooves in the bearing surface of the flanges on opposed sides of the pilot. The pierce nuts may be interconnected by frangible connectors, such as wires, as shown, for example, in U.S. Pat. No. 3,845,860, also assigned to the predecessor in interest of the assignee of this application, or the self-attaching nuts may be delivered to the fastener installation head in bulk form.

The fastener installation apparatus of this invention may also be utilized to install T-shaped pierce nuts, as disclosed in U.S. Pat. No. 3,152,628, or clinch nuts as disclosed in U.S. Pat. No. 2,750,660. Both of these patents are also assigned to the predecessor in interest of this application. Although the fastener installation head of this invention is not specifically designed for installing cold-formed self-attaching fasteners, such as the installation head disclosed in U.S. Pat. No. 5,042,518, also assigned to the predecessor in interest of the assignee of this application, the principles of this invention may be also utilized for such applications.

As set forth above, the fastener installation apparatus of this invention is particularly, but not exclusively, for an application having limited or restricted space, wherein the plunger which drives the self-attaching fastener into the panel must have a very limited or short stroke as compared to conventional self-attaching fastener installation heads, sometimes referred to as "pressure pierce heads." U.S. Pat. No. 4,505,416 assigned to the assignee of the predecessor in interest of this application discloses a pressure pierce head for such applications. As disclosed in this patent, the self-attaching fastener installation head includes a fixed member and a moveable member resiliently biased away from the fixed member by a coil spring and the fixed member includes a plunger which reciprocates through a plunger passage in the moveable member, such that a self-attaching fastener is installed in a panel located opposite the plunger passage with each stroke of a press. The fixed member may be installed in a conventional die press, which simultaneously forms the panel, or the pressure pierce head may be utilized in a separate press assembly as described further below. However, the pressure pierce installation head disclosed in U.S. Pat. No. 4,505,416 had several problems including wear of the guide shanks or bolts resulting in limited life in mass production applications and the moveable member, which includes a feed passage, is formed of a single block of metal requiring replacement of the entire moveable member in the event of damage to the moveable member. Also, the pressure pierce installation head disclosed in this patent is subject to alignment problems because the plunger was not sufficiently guided by the guide bolts for rugged use in mass production applications. Another problem was that it was not practical to include a sensor, such as a proximity probe, in this head design.

The pressure pierce head disclosed in U.S. Pat. No. 4,505,416 was then replaced by the pressure pierce head assembly disclosed in U.S. Pat. No. 6,442,830, assigned to the assignee of this application, the disclosure of which is incorporated by reference. The pressure pierce head disclosed in U.S. Pat. No. 6,442,830 has several important advantages over the pressure pierce head disclosed in U.S. Pat. No. 4,505,416, particularly including more accurate guidance of the guide shank by incorporating a bushing surrounding the guide shank and thus better guidance of the plunger, resulting in more rugged construction. Another advantage of the pressure pierce head disclosed in U.S. Pat. No. 6,442,830 is reduced maintenance costs. The moveable member is comprised of a face plate or nut track and a nut cap, which are bolted together, and the nut passage is defined between the face plate and the nut cap, permitting replacement of either of these components following damage or wear. The plunger passage is defined by aligned openings in the face plate and nut cap and a nose plate and the movement of the moveable member assembly is limited by keepers attached to the fixed member, rather than the guide bolts.

As will be understood by those skilled in this art, it is very important to assure that a fastener is received through the feed passage into the plunger passage prior to actuation of the fastener installation apparatus. U.S. Pat. No. 6,442,830 discloses a conventional proximity probe located in the plunger passage opposite the feed passage which indicates the presence or absence of a fastener in the plunger passage prior to actuation of the press. That is, a fastener received through the feed passage engages the head of the proximity probe, indicating the presence of a fastener in the plunger passage. The proximity probe is then connected to the control of the press in a conventional manner permitting actuation of the press when a fastener is located in the plunger passage. However, this conventional arrangement results in wear or damage to the proximity probe in mass production applications. Further, the leg of the plunger required a machined slot to clear the proximity probe during actuation, resulting in additional expense. It would thus be desirable to avoid direct contact of the fastener with the proximity probe.

Another problem associated with all conventional installation apparatus for self-attaching fasteners is installing self-attaching fasteners in close proximity in a panel. In a conventional self-attaching fastener installation head, the spacing of the fasteners in a panel is limited by the size of the nose or moveable member. That is, where two self-attaching fasteners are to be installed in a panel in relatively close relation, the spacing between the fasteners is limited by the combined width of the adjacent nose members of the installation heads and the installation heads must be spaced in the die assembly. In many applications, however, it would be desirable to attach self-attaching fasteners to a panel in relatively close proximity, wherein the spacing between the self-attaching fasteners is less than the combined width of the adjacent nose members of the separate installation heads.

Further, as will be understood by those skilled in this art, the installation heads must be spaced in the die assembly to avoid interference between the installation heads and to provide adequate support for the installation heads.

The improved fastener installation apparatus of this invention solves these problems by avoiding contact of the fasteners with the proximity probe and permits the simultaneous installation of two or more self-attaching fasteners in a panel in relatively close proximity. As will be understood from the following description of the fastener installation apparatus of this invention, these improvements may be utilized in combination or separately.

SUMMARY OF THE INVENTION

As described above, the fastener installation apparatus of this invention is designed to solve two separate problems associated with self-attaching fastener installation heads, namely the application of two or more adjacent self-attaching fasteners in a panel in close proximity and the elimination of wear or damage to the proximity probe or debris interfering with sensing of a fastener in the plunger passage. First, the fastener installation apparatus of this invention may be utilized to simultaneously install a plurality of self-attaching fasteners in a panel in relatively close proximity. In one preferred embodiment of the fastener installation apparatus of this invention, the plunger includes at least two spaced generally parallel projecting end portions or legs adapted to be fixed relative to a fixed member. As will be understood by those skilled in this art, the plunger may be attached or releasably attached to the fixed member or abut the fixed member during reciprocal motion of the plunger through the plunger passage and thus adapted to be fixed relative to the fixed member. Further, where it is desirable to simultaneously install more than two fasteners in a panel, the plunger would have more than two spaced generally projecting end portions or a plurality of spaced generally parallel projecting end portions. In one disclosed embodiment of the plunger, the plunger is generally shaped including a body portion fixed relative to the fixed member having at least two spaced generally parallel legs or projecting end portions preferably integral with a body portion. In a second, more preferred embodiment of the fastener installation apparatus of this invention, the plunger assembly comprises at least two separate parallel plungers in close proximity each having a base or support portion which, in the disclosed embodiment is cylindrical, received in a configured opening in the fixed member and a leg or plunger portion telescopically receivable in a plunger passage. In the disclosed embodiment, the leg portion of the plungers is rectangular in cross-section, permitting rotation of the plunger 180° if the cutting edge is damaged. Further, this embodiment assures accurate alignment of the plungers of the plunger assembly and eliminates fasteners which may shear under heavy loading.

The fastener installation apparatus further includes a moveable member or assembly resiliently biased away from the fixed member having at least two spaced generally parallel feed passages, each feed passage simultaneously receiving a fastener to be installed by the fastener installation apparatus. Each of the feed passages communicate with a generally transverse plunger passage aligned with one of the projecting leg portions of the plunger assembly, whereby at least two fasteners located in the plunger passages are simultaneously installed by the fastener installation apparatus of this invention upon movement of the moveable member toward the fixed member. Because the plunger passages may be located in relatively close proximity in the moveable or nose member, two or more self-attaching fasteners may be simultaneously installed in a panel with the fastener installation apparatus of this invention in closer relation than a conventional fastener installation apparatus having a plurality of installation heads.

In the disclosed embodiment, the fastener installation apparatus includes a guide shank having one end attached to a moveable member having a bore which receives a coil spring resiliently biasing the moveable member away from the fixed member and the fastener installation apparatus includes a bushing surrounding the guide shank reducing wear of the guide shank and accurately guiding movement of the moveable member relative to the fixed member as disclosed in the above-referenced U.S. Pat. No. 6,442,830. However, the principle of simultaneously installing a plurality of self-attaching fasteners with the fastener installation apparatus of this invention may also be utilized with other types of self-attaching fastener installation heads.

A preferred embodiment of the fastener installation apparatus of this invention also includes a fastener sensor system which senses the presence of a fastener in the plunger passage or plunger passages, but avoids failure of the sensor system resulting from wear or damage to the sensor or false sensing resulting from build up of chips or debris in the plunger passage. In one preferred embodiment, the fastener installation apparatus includes a sensor, such as a proximity probe, which extends generally perpendicular to the plunger passage and the feed passage having an end portion adjacent to, but spaced from the plunger passage, sensing a presence of a fastener in the plunger passage without the fastener contacting the sensor. The assembly further includes a stop surface opposite the feed passage, defining a surface of the plunger passage, limiting movement of the fastener from the feed passage to the plunger passage, such that the fastener may engage the stop surface, rather than the sensor. In the disclosed embodiment, the sensor is an elongated proximity probe having a longitudinal axis extending generally perpendicular to the plunger passage and the feed passage having an end portion adjacent to, but spaced from the plunger passage. In the disclosed embodiment, the proximity probes are cylindrical, but may have any conventional shape. Thus, the self-attaching fasteners received in the plunger passage do not contact the proximity probe, eliminating wear of the proximity probe and false readings from the sensor. Where the fastener installation apparatus of this invention simultaneously installs at least two self-attaching fasteners in a panel, as described above, the fastener installation apparatus includes a sensor adjacent to but spaced from each of the plunger passages. However, the improved sensor may also be utilized in the fastener installation apparatus disclosed in the above-referenced U.S. Pat. No. 6,442,830. Another advantage of the sensor system of this invention is that the lines or wires from the proximity probes extend from the moveable member generally perpendicular to the plunger passages, reducing the space required for the installation apparatus.

Other advantages and meritorious features of the fastener installation apparatus of this invention will be more fully understood from the following description of the preferred embodiments, the appended claims and the drawings, a brief description of which follows. As will be understood, however, the disclosed embodiments of the fastener installation apparatus of this invention are exemplary of this invention only and the disclosed embodiments do not limit the invention except as set forth in the appended claims.

DESCRIPTION OF THE PREFERRED EMBODIMENTS

The disclosed embodiments of the fastener installation apparatus of this invention is adapted to install self-attaching fasteners in a metal panel in mass production applications, such as utilized by the automotive and appliance industries. The above-referenced patents disclose several types of self-attaching nuts available from the assignee of this patent application. However, the fastener installation apparatus may be adapted to install various types of self-attaching fasteners, including but not limited to pierce and clinch nuts. As set forth above, the fastener installation apparatus of this invention is particularly, but not exclusively, adapted for installation of self-attaching fasteners where the space available for the installation head is limited or restricted, such that the stroke of the plunger assembly which engages and installs the self-attaching fastener in a panel opposite the plunger passage, is relatively short when compared to conventional pierce nut installation heads as described above. The embodiments of the fastener installation head disclosed in this application may be installed in a die shoe of a die press (not shown), such that a fastener is installed in the panel with each stroke of the die press. However, the fastener installation head of this invention is also adapted for utilization in a separate press assembly as disclosed, for example, in the above-referenced U.S. Pat. No. 6,442,830, the disclosure of which is incorporated herein by reference. In this assembly, the fastener installation head is mounted on a stationary or fixed member and the die member is mounted on a power cylinder which drives the die member against a moveable member of the installation head (described below), which drives the end portion or portions of the plunger assembly through the plunger passage or passages and installs a self-attaching fastener or fasteners in the panel. As set forth above, the disclosed embodiments of the fastener installation apparatus or head of this invention are for illustrative purposes only and various modifications may be made to the disclosed embodiments of the fastener installation head particularly, but not exclusively, for adapting the fastener installation apparatus of this invention to install various types of self-attaching fasteners.

Figure 1:
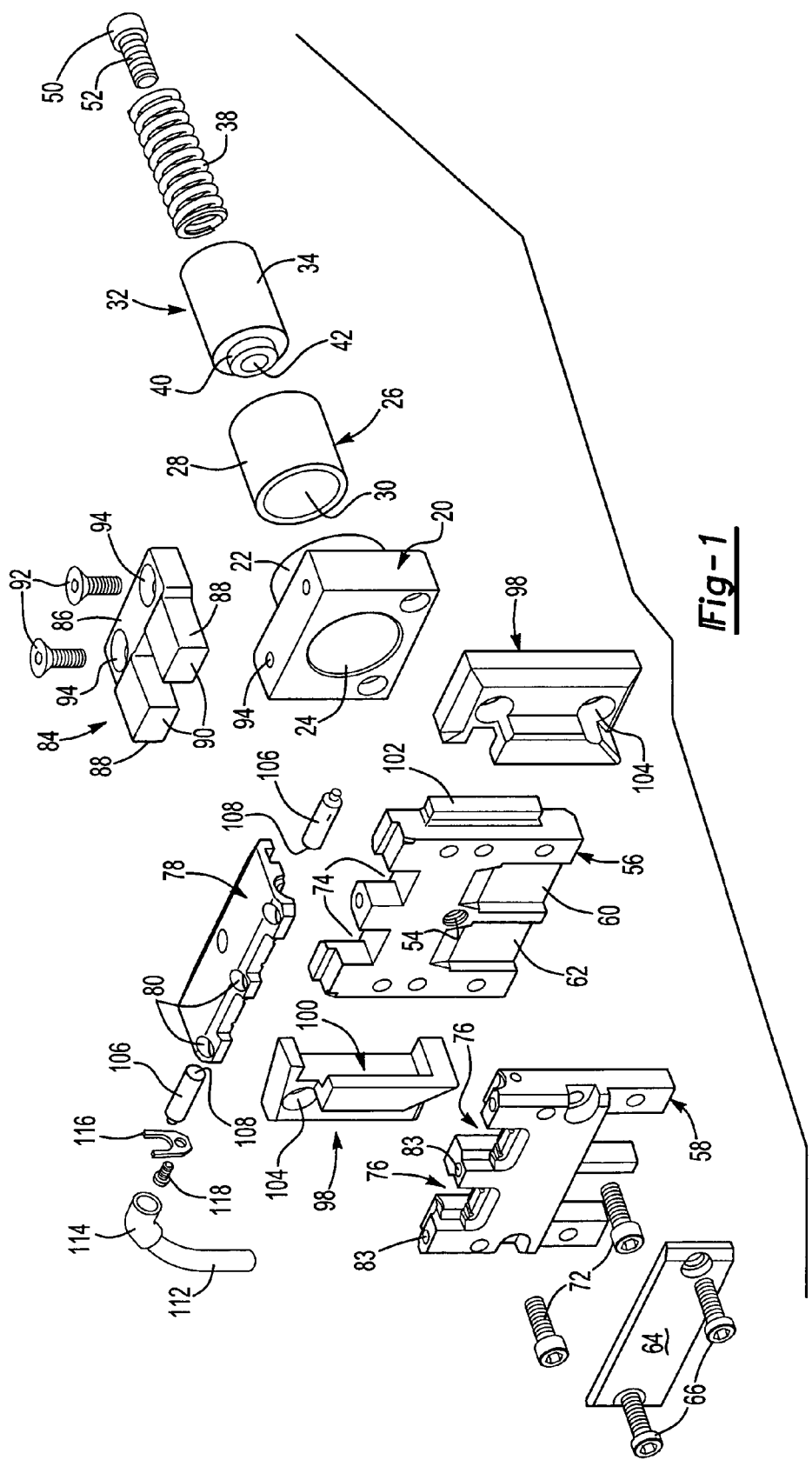
FIG. 1 is a partial exploded view of one embodiment of the fastener installation apparatus of this invention.
Figure 6:
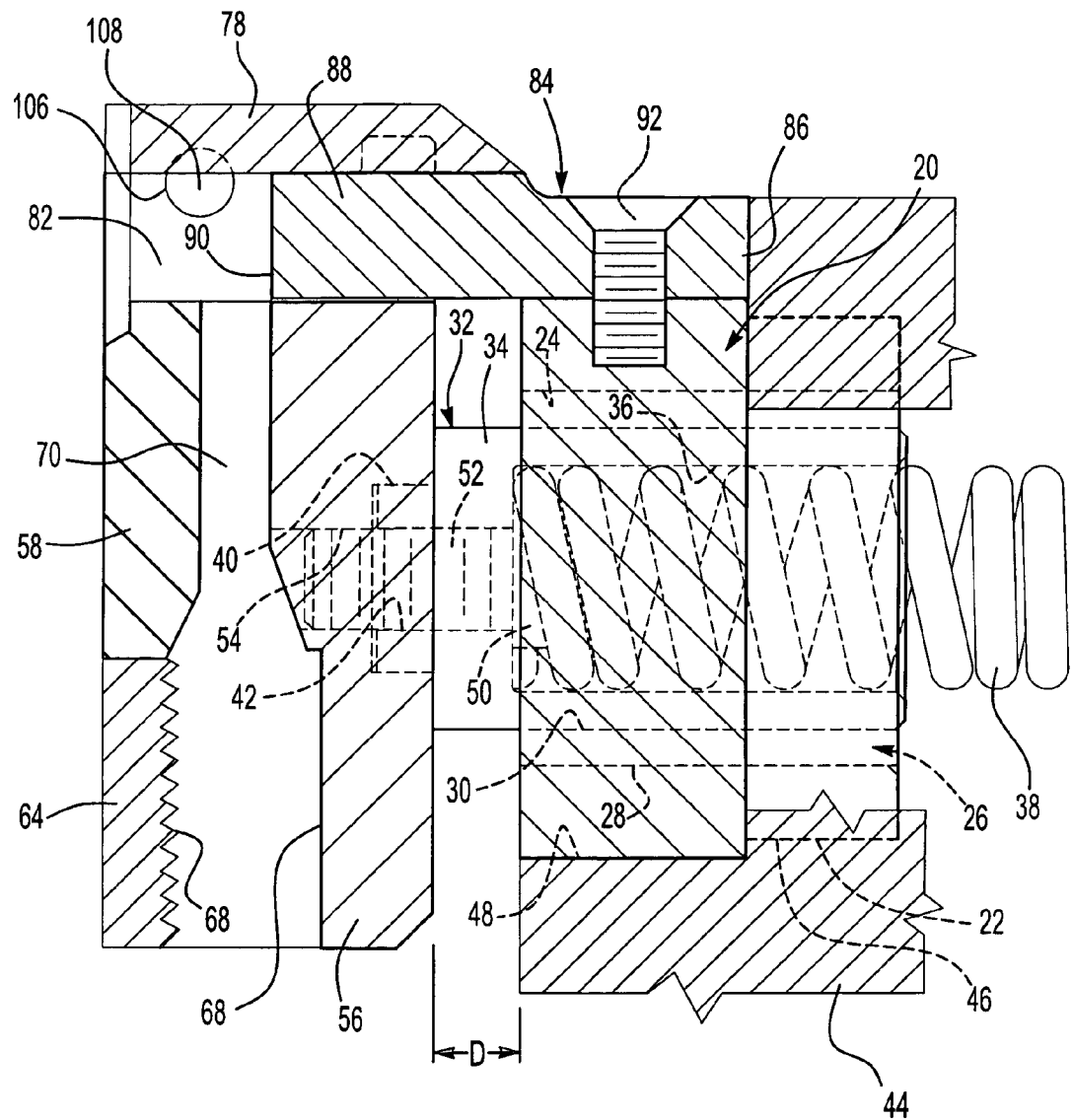
FIG. 6 is a cross-sectional view of FIG. 2 in the direction of view arrows 6—6.

FIG. 1 is an exploded view of one embodiment of the fastener installation apparatus of this invention adapted to simultaneously install two self-attaching fasteners in a panel (not shown). As will be understood from the following description, however, the disclosed embodiment of the fastener installation head may be modified to simultaneously install three or more fasteners in a panel with minor modifications. The components of the fastener installation apparatus or head disclosed in FIG. 1 includes a fixed member 20 or base which is generally rectangular having a cylindrical boss 22 and a cylindrical bore 24 extending through the rectangular body portion and the cylindrical boss 22. A bushing 26 formed of a softer metal, such as brass, bronze or similar materials, includes a cylindrical outer surface 28 which is press fit into the cylindrical bore 24 of the fixed member as shown in FIG. 6. The bushing 26 includes a cylindrical bore 30 which telescopically receives a guide shank 32 having a cylindrical outer surface 34 and a cylindrical bore 36 as also shown in FIG. 6. The cylindrical bore 36 of the guide shank 32 receives a coil spring 38 as shown in FIG. 6. The guide shank 32 includes a cylindrical boss 40 having a bore 42 coaxially aligned with the cylindrical bore 36 through the guide shank 32 as shown in FIG. 6. As also shown in FIG. 6, the fixed member 20, bushing 26 and guide shank 32 may be received in a support member 44, such as the fixed arm of a press assembly as disclosed in the above-referenced U.S. Pat. No. 6,442,830 assigned to the assignee of this application. The support member 44 shown in FIG. 6 includes a bore 46 which receives the cylindrical boss 22 of the fixed member and a rectangular opening 48 which receives the rectangular body of the fixed member 20, preventing movement of the fixed member 20 during installation of fasteners, including rotation. The moveable member assembly (described below) is retained by bolt 50 having a threaded shank portion 52, which is threadably received in threaded bore 54 of the nut cap 56 shown in FIGS. 1 and 6, wherein the moveable member assembly includes the nut cap 56 and the nut track 58 as described below.

Figure 2:
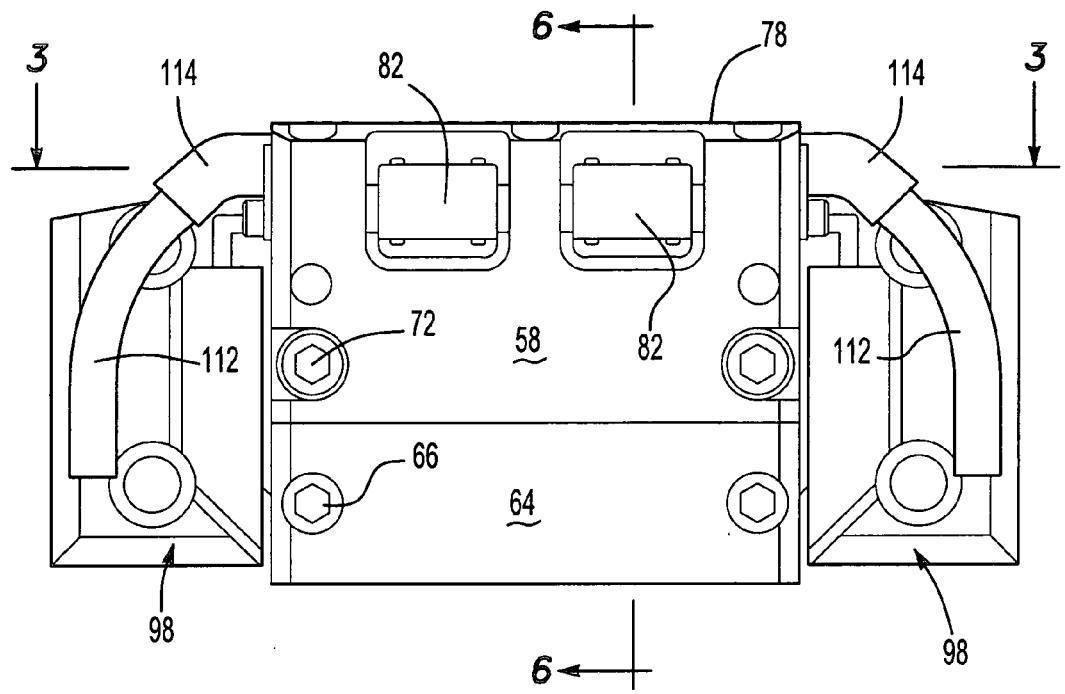
FIG. 2 is a side assembled view of the fastener installation apparatus shown in FIG. 1.
Figure 3:
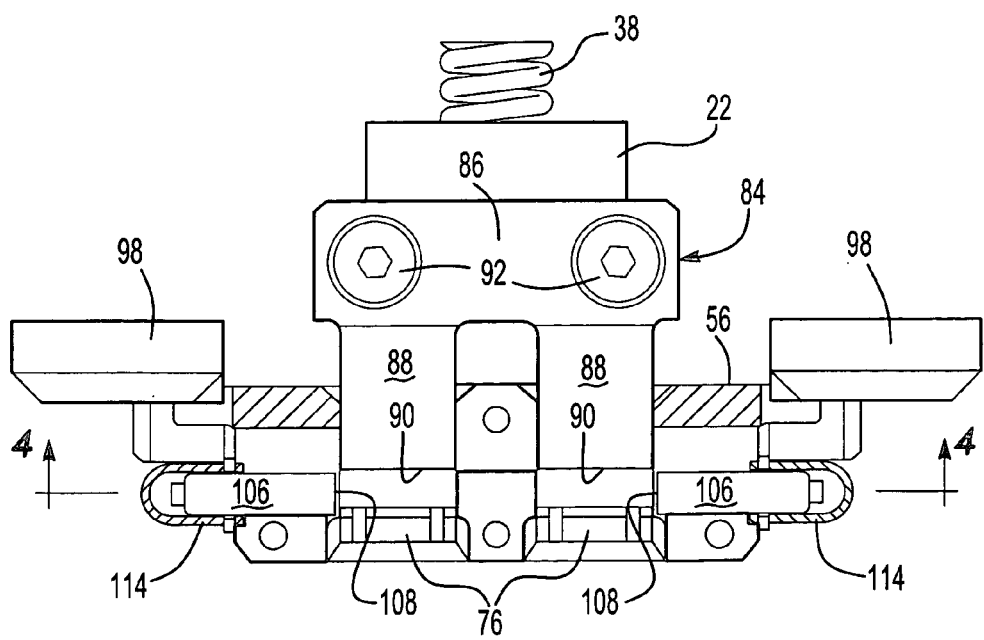
FIG. 3 is a top cross-sectional view of FIG. 2 in the direction of view arrows 3—3.

As shown in FIG. 1, the nut cap 56 includes two parallel spaced channels 60, 62 which may receive flexible chuting or tracks (not shown) which deliver self-attaching pierce or clinch nuts of the types described above to the fastener installation head. The moveable member assembly further includes a cover plate 64 which is attached to the nut track 58 by machine screws 66 having a machined roughened surface 68, as shown in FIG. 6, which retains the nut tracks or polymeric chutes (not shown) receiving nuts for installation by the fastener installation head. As shown in FIG. 6, the self-attaching nuts (not shown) are received in parallel feed passages 70 defined between the nut cap 56 and the nut track 58, which are secured together by machine screws 72 shown in FIG. 1. The nut cap 56 and nut track 58 have aligned parallel rectangular slots 74 and 76, respectively, which partially define parallel plunger passages 82 (see FIGS. 2 and 4) for simultaneous receipt of two self-attaching fasteners from the feed passages 70. The end surface of the plunger passages is defined by nose plate 78, such that fasteners received through the feed passages 70 engage the nose plate 78 as described in more detail hereinbelow. The nose plate 78 is attached to the nut track 58 by machine screws (not shown) received through openings 80 in the nose plate 78 and threaded into threaded openings 83 in the nut track 58. Thus, as used herein, the moveable member assembly comprises the nut cap 56, nut track 58, the cover plate 64 and the nose plate 78 which, in combination, define generally parallel feed passages 70 which simultaneously receive a fastener for installation by the installation apparatus and which communicate with generally transverse plunger passages 82 (see FIGS. 4 and 6) which receive fasteners from the feed passages 70 to engage an opposed surface of the nose plate 78.

The fastener installation apparatus further includes a plunger assembly 84 best shown in FIG. 1. In this embodiment, the plunger assembly 84 is generally C-shaped having a body portion 86 and spaced generally parallel projecting end portions or legs 88. The legs 88 include planar end faces 90 which simultaneously engage fasteners (not shown) received from the generally parallel spaced feed passages 70 into the plunger passages 82 as described further below. The body portion 86 of the plunger 84 is secured to the fixed member 20 by machine screws 92, received through openings 94 in the body portion 86 of the plunger assembly 84, which are threaded into the openings 94 of the fixed member 20. Movement of the moveable member assembly, including the nut cap 56 and nut track 58, away from the fixed member 20 is limited by gib blocks or keepers 98, each having a channel-shaped opening 100 which receive the ears 102 on opposed sides of the nut cap 56. The gib blocks 98 may be fixed to the support member 44 (see FIG. 6) by machine screws (not shown) received through openings 104 to the support member 44 shown in FIG. 6, fixing the fastener installation apparatus or head to the support member 44.

Figure 4:
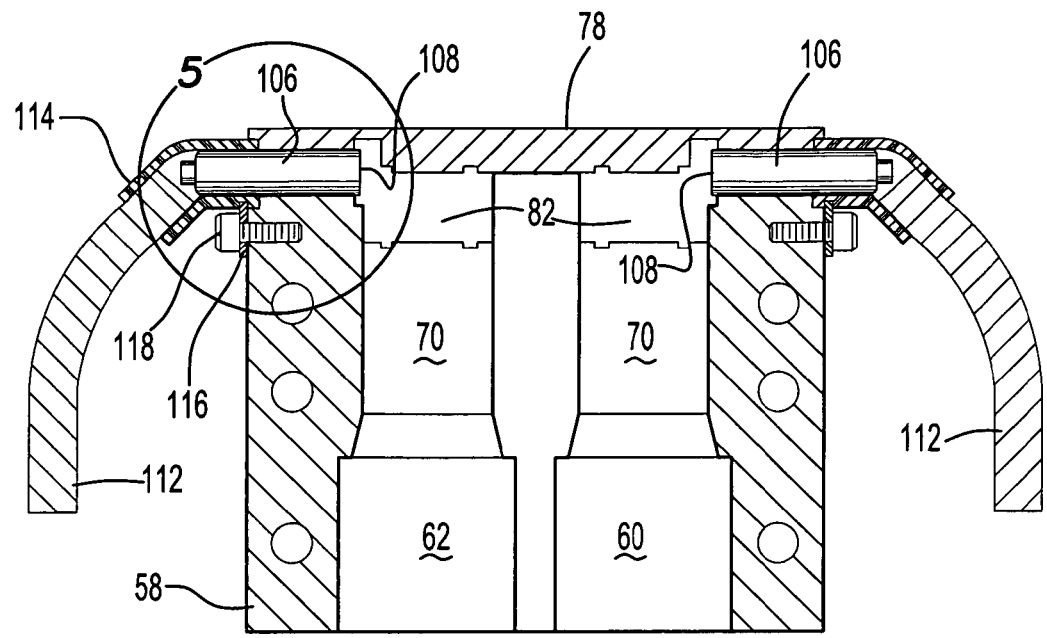
FIG. 4 is a cross-sectional view of FIG. 3 in the direction of view arrows 4—4.
Figure 5:
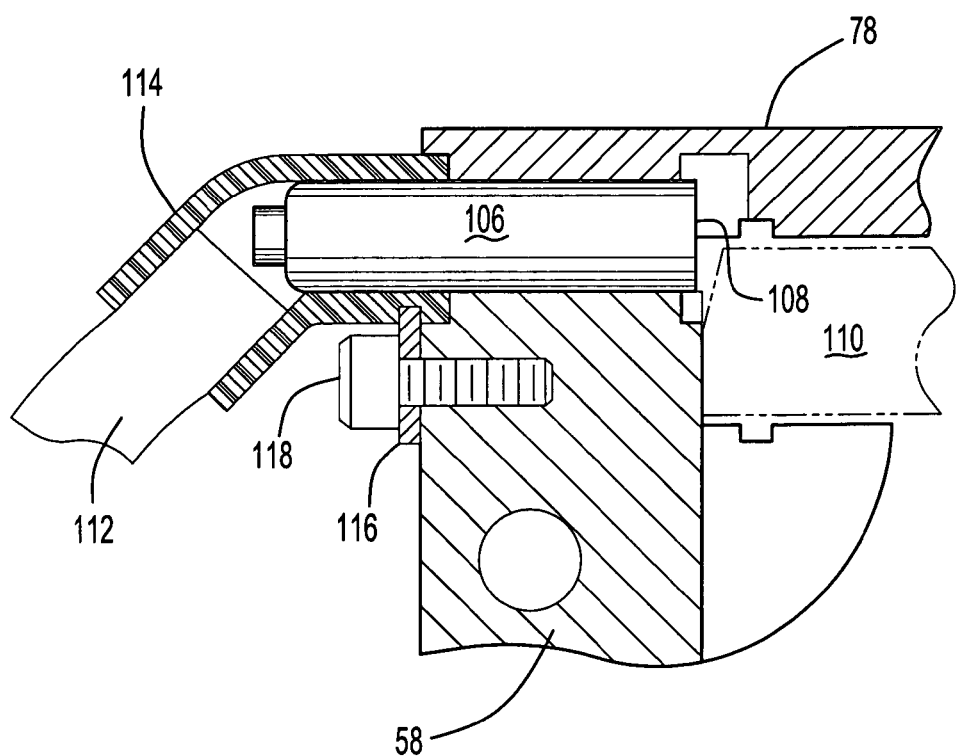
FIG. 5 is an enlarged view of the section of the encircled portion of FIG. 4 marked 5.

As will now be understood from the above description of the disclosed embodiment of the fastener installation apparatus, the moveable member assembly, including the nut cap 56, nut track 58 and the nose plate 78, is biased away from the fixed member 20 by the coil spring 38, but the movement of the moveable member assembly away from the fixed member 20 is limited by the gib blocks or keepers 98 and the "stroke" of the plunger 86 is thus limited to the distance "D" shown in FIG. 6. In a typical application, the stroke of the plunger is ⅜ to ⅝ inches. Thus, the fastener installation apparatus of this invention is particularly, but not exclusively, adapted for simultaneously installing two self-attaching fasteners in panel (not shown) opposite said plunger passages 82 in a very confined space. The disclosed embodiments of the fastener installation apparatus of this invention further include a proximity probe 106 adjacent to but spaced from each of the plunger passages 82 as now described. FIGS. 4 and 5 illustrate the location and operation of the proximity probes 106. As shown, each proximity probe 106 in the disclosed embodiment is generally cylindrical having an end surface 108 facing the plunger passage 82, but spaced from the plunger passage 82, such that a fastener 110, shown in phantom in FIG. 5, may engage the nose plate 78, but will not engage a proximity probe 106. However, as set forth above, the proximity probes 106 may have any conventional shape. Thus, the embodiments of the fastener installation apparatus of this invention avoid damage to or wear of the proximity probes 106, which is a problem with the prior art. Further, the cables 112 connecting the proximity probes 106 to the control of the press (not shown) extend perpendicular to both the plunger passages 82 and the feed passages 70, further reducing the space required for the fastener installation apparatus of this invention. The cables 112 each include a conventional proximity probe cover 114 which is secured to the nut track 58 by proximity probe clips attached by machine screws 118 to the sides of the nut track 58. As will now be understood, fasteners received through the generally parallel feed passages 70 into the transverse generally parallel plunger passages 82 are sensed by the proximity probes 106 without contacting the proximity probes thereby eliminating wear or damage to the proximity probes and false readings which may result in scrap of the panel.

The operation of the fastener installation apparatus or head shown in FIGS. 1 to 6 may now be described as follows. As set forth above, the fastener installation apparatus of this invention was specifically designed for installing pierce or clinch nuts in a panel located opposite the plunger passages 82. However, the principles of this invention may also be utilized to install other types of fasteners. In the disclosed embodiment, two fasteners are simultaneously received in the spaced, generally parallel feed passages 70 (see FIG. 4) and the fasteners are then received in the generally transverse parallel plunger passages 82 (see FIGS. 2 and 4), where the presence of the fasteners in the plunger passages 82 ready for installation are sensed by the opposed proximity probes 106. The fastener feed mechanism may be any conventional feed mechanism, such as tracks or chutes (not shown) receiving self-attaching fasteners in bulk form or the fasteners interconnected by frangible connector elements as known in this art. As disclosed more fully in the above-referenced U.S. Pat. No. 6,442,830, the disclosed embodiment of the fastener installation apparatus of this invention may be attached to a support member or the arm of a support member, such that a metal panel supported on a die member is driven against the end face of the nut track 58 and cover member 64, which drives the moveable member assembly, including the nut track 58, nut cap 56 and nose plate 78, toward the fixed member 20 to engage the fixed member 20, driving the free ends or legs 88 of the plunger 84 through the plunger passages 82, wherein the end faces 90 of the legs 88 engage the fasteners and drive the fasteners through the plunger passage against a metal panel (not shown) opposite the plunger passages 82, simultaneously installing two fasteners in close proximity in the metal panel.

Figure 7:
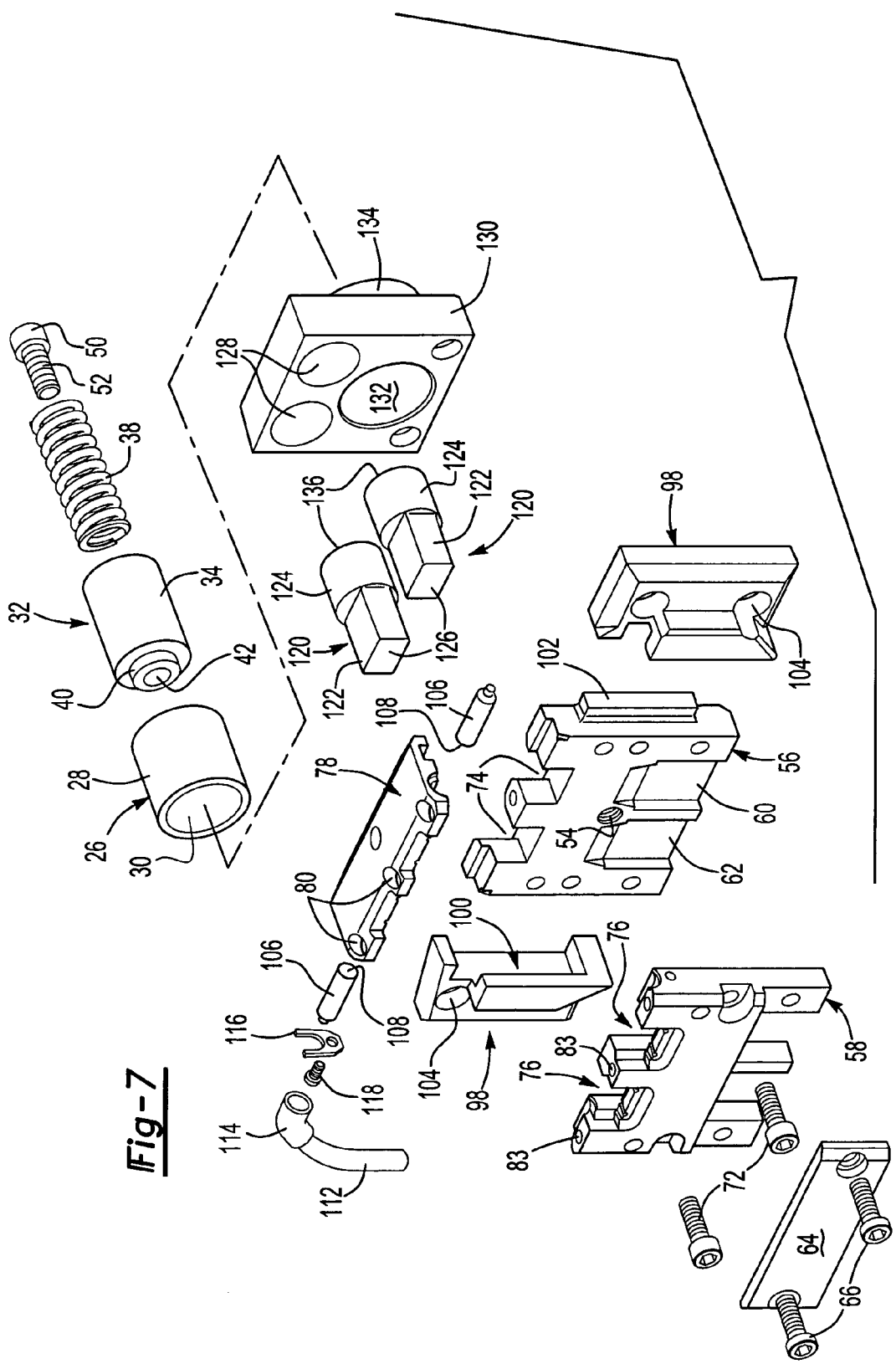
FIG. 7 is a partial exploded view of an alternative embodiment of the fastener installation apparatus of this invention.
Figure 8:
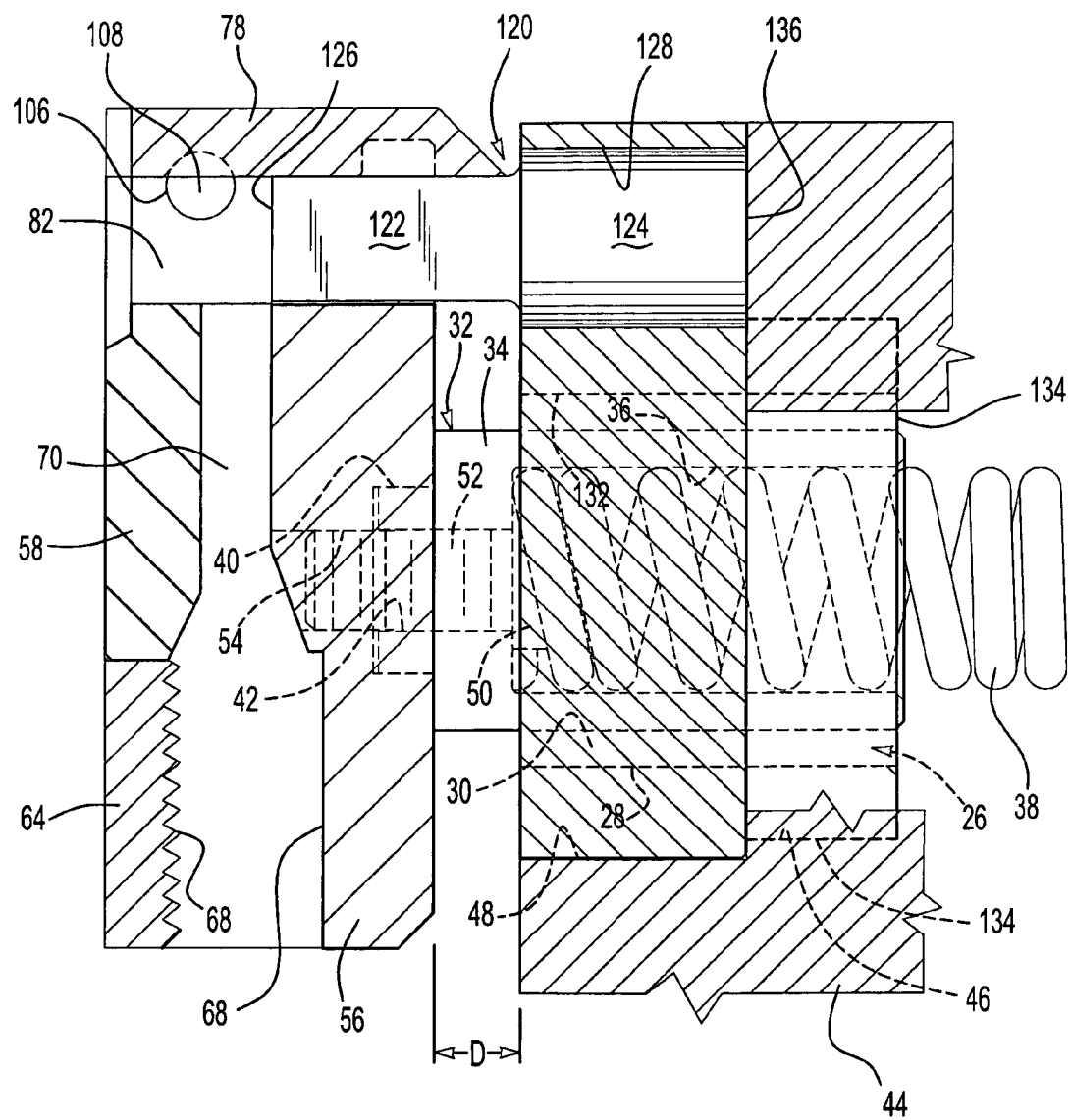
FIG. 8 is a cross-sectional view, similar to FIG. 6, of the embodiment of the fastener installation apparatus shown in FIG. 7.

In the embodiment of the fastener installation apparatus of this invention shown in FIGS. 7 and 8, the plunger assembly comprises two parallel plungers 120, each having a projecting end portion or leg 122 and a body portion 124. In one preferred embodiment, the legs or projecting end portions 122 of the plungers 120 are rectangular in cross-section, each having a planar end face 126. In this embodiment, the body portion 124 is cylindrical, as shown in FIG. 7, and the cylindrical body portions are received in cylindrical openings 128 in the fixed member 130. As will be understood by those skilled in this art, the plungers 120 are preferably formed of hardened tool steel and the cylindrical body portions 124 are preferably polished to provide a close slip fit in the cylindrical openings 128. As described above, the fastener installation apparatus of this invention may be utilized to install pierce or clinch nuts which are interconnected by frangible connectors as disclosed in the above-referenced U.S. Pat. No. 3,845,860. As disclosed in this patent, the pierce or clinch nuts are fed to the installation head in a continuous strip, wherein a fastener received in the plunger passage is engaged by a plunger which shears the frangible wires interconnecting the fasteners in the strip and drives the fastener through the plunger passage into a panel opposite the plunger passage. In such installations, the leg portion 122 is rectangular having relatively sharp edges which shear the frangible connectors as the plunger is driven through the plunger passage, resulting in wear or damage to the cutting edge defined between the planar end faces 126 and the rectangular projecting end portions 122. In this embodiment of the plunger assembly, however, the plungers 120 may be rotated 180°, presenting a new cutting edge without replacement of the plunger 120.

The plunger assembly shown in FIGS. 7 and 8 provide further advantages, as follows. First, because the longitudinal axes of the plungers 120 are parallel to the axis of the guide shank 32, such that accurate alignment of the plungers 120 with the plunger passages 82 shown in FIG. 8 is assured. That is, assembly and disassembly of the plungers 120 will always accurately align the plungers with the plunger passages 82. Second, the machine screws 92 which attach the plunger 84 to the fixed member 20 shown in FIG. 1 are under a shear load as the planar end faces 90 are driven through the plunger passages 82. The embodiment of the fastener installation apparatus shown in FIGS. 7 and 8 eliminates the requirement for fasteners, particularly transverse fasteners 92 shown in FIG. 1 connecting the plunger assembly to the fixed member 130. As will be understood, however, the preferred shape of the body portion 124 of the plungers 120 will depend upon the application, but the openings 128 in the fixed member 130 which receive the body portions of the plungers 120 are preferably configured to closely receive the body portions 124. That is, the body portions 124 could be rectangular, in which case the openings 128 will also be rectangular. As described above, the fixed member 130 is preferably rectangular having a cylindrical boss 134 and the cylindrical opening 132 which receives the bushing 26 extends through the cylindrical boss 134.

As shown in FIG. 8, the end faces 136 of the body portions 124 abut the support member 44, such that the plungers 120 are fixed relative to the fixed member 130 during installation of fasteners (not shown). As described above, the end faces 136 of the plungers 120 may be initially spaced from the support member 44 depending upon the length of the body portions 124 and the desired stroke of the plungers 120 through the plunger passages, such that the plungers 120 are fixed relative to the fixed member 130 during actuation of the fastener installation apparatus. The remaining components of the fastener installation apparatus shown in FIGS. 7 and 8 may be identical to the fastener installation apparatus shown in FIGS. 1 to 6 and thus have been numbered the same as in FIGS. 1 to 6. That is, the fastener installation apparatus shown in FIGS. 7 and 8 includes a moveable member assembly comprising a nut cap 56, a nut track 58, cover plate 64 and nose plate 78. The moveable member assembly is resiliently biased away from the fixed member 130 by a coil spring 38 and the movement of the moveable member assembly is guided by the guide shank 32, which is telescopically received through the bushing 26. Self-attaching fasteners are simultaneously received through the feed passages 70 into the plunger passages 82 where the location of the self-attaching fasteners (not shown) are sensed and confirmed by the proximity probes 106 having an end portion 108 adjacent to, but spaced from the plunger passages 82 as described above with reference to FIGS. 4 and 5. Further, the operation of the fastener installation apparatus shown in FIGS. 7 and 8 is identical to the fastener installation apparatus shown in FIGS. 1 to 6 described in detail above. That is, the fastener installation apparatus shown in FIGS. 7 and 8 is actuated by driving a metal panel supported on a die member (not shown) against the moveable member assembly, driving the free ends or legs 122 of the plungers 120 through the plunger passages 82 simultaneously installing two self-attaching fasteners in the panel as described above. As will be understood from the above description, however, the fastener installation apparatus shown in FIGS. 7 and 8 may include more than two plungers simultaneously installing a plurality of self-attaching fasteners in the panel.

As set forth above, various modifications may be made to the fastener installation apparatus or head of this invention within the purview of the appended claims. More specifically, the improvements made to the fastener installation apparatus disclosed in U.S. Pat. No. 6,442,830 disclosed in this application may be utilized in combination, as disclosed herein, or separately. The disclosed embodiments of the fastener installation head of this invention were designed for simultaneously installing two self-attaching fasteners in a metal panel in close proximity, which is an important advantage of the fastener installation apparatus of this invention. However, as will now be understood, the moveable member assembly may have three or more generally parallel spaced feed passages 70 each of which communicate with a generally transverse plunger passage 82, wherein the plunger assembly includes three ore more free end portions or legs 88 and 122 which are received through the plunger passages 82 during actuation of the fastener installation apparatus as described above. Each of the plunger passages 82 would then include a proximity probe 106. Further, the improvement provided by the location and orientation of the proximity probes 106 may be utilized in the fastener installation apparatus disclosed in U.S. Pat. No. 6,442,830, wherein the moveable member assembly includes only one feed and one plunger passage, eliminating wear and damage to the proximity probe because the fasteners do not contact the proximity probe during installation. The location and orientation of the proximity probes may also be utilized in other fastener installation apparatus, for example, of the type disclosed to in the above-referenced patents. Further, as described above, the plunger 84 and plungers 120 need not be directly attached to a fixed member, but may be located between the moveable member assembly and the fixed member, to engage the fixed member during actuation of the installation apparatus and is thus fixed relative to the fixed member during installation of a fastener. Having described a preferred embodiment of the fastener installation apparatus or head of this invention, the invention is now claimed, as follows.

What is claimed is:

1. A fastener installation apparatus, comprising:
    a fixed member;
    a plunger assembly adapted to be fixed relative to said fixed member including a projecting leg having a free end;
    a moveable member spring biased away from said fixed member having a feed passage receiving fasteners for installation by said fastener installation apparatus communicating with a generally transverse plunger passage opposite said projecting leg of said plunger assembly receiving said free end of said plunger through said plunger passage upon movement of said moveable member toward said fixed member to install a fastener in a panel located opposite said plunger passage;
    a stop surface opposite said feed passage defining a surface of said plunger passage limiting movement of a fastener from said feed passage into said plunger passage; and
    an elongated proximity probe having a longitudinal axis extending generally perpendicular to said plunger passage and said feed passage having an end portion adjacent to, but spaced from said plunger passage, sensing a presence of a fastener in said plunger passage without said fastener contacting said proximity probe.

2. The fastener installation apparatus as defined in claim 1, wherein said proximity probe is cylindrical having a line connected to a control of said fastener installation apparatus extending from said fastener installation apparatus generally perpendicular to said plunger passage.

3. The fastener installation apparatus as defined in claim 1, wherein said plunger assembly includes a plurality of spaced generally parallel legs, each leg having a free end, said moveable member including a plurality of spaced generally parallel feed passages, each feed passage simultaneously receiving a fastener for installation by said fastener installation apparatus, and each fastener passage communicating with a generally transverse plunger passage receiving one of said plurality of spaced generally parallel legs of said plunger assembly and simultaneously installing a plurality of fasteners in a panel located opposite said plunger passage.

4. The fastener installation apparatus as defined in claim 3, wherein said plunger assembly includes a body portion and a plurality of spaced generally parallel legs integral with said body portion.

5. The fastener installation apparatus as defined in claim 3, wherein said plunger assembly includes a plurality of separate parallel plungers, each plunger including a body portion fixed relative to said fixed member.

6. The fastener installation apparatus as defined in claim 5, wherein said body portion of each of said plurality of plungers is received in an opening in said fixed member configured to receive said body portion.

7. The fastener installation apparatus as defined in claim 1, wherein said moveable member is comprised of two opposed mating moveable members and said plurality of spaced generally parallel feed passages are defined between said opposed mating moveable members.

8. The fastener installation apparatus as defined in claim 1, wherein said fastener installation apparatus includes a shank having a free end connected to said moveable member surrounded by a bushing guiding movement of said moveable member and limiting wear of said shank.

9. The fastener installation apparatus as defined in claim 1, wherein said stop surface is a plate releasably attached to said moveable member.

10. A fastener installation apparatus, comprising:
a fixed member including at least two openings each having an end wall;
a plunger assembly including at least two separate parallel plungers each having a body portion configured to be closely received in said openings in said fixed member and a plunger portion projecting from said fixed member each having an end face; and
a moveable member resiliently biased away from said fixed member having at least two feed passages each simultaneously receiving a fastener to be installed by said fastener installation apparatus and each communicating with a generally transverse plunger passage aligned with one of said projecting plunger portions of said plunger assembly, whereby at least two fasteners are simultaneously installed by said fastener installation apparatus upon movement of said moveable member toward said fixed member, thereby receiving said projecting pilot portion of said plunger assembly through said plunger passages.

11. The fastener installation apparatus as defined in claim 10, wherein said body portion of each of said plungers is cylindrical and said openings in said fastener member are cylindrical, permitting rotation of said plungers relative to said fixed member.

12. A fastener installation head, comprising:
a feed passage receiving fasteners for installation by said installation bead having opposed side walls;
a plunger passage intersecting and communicating with said feed passage;
a plunger reciprocating through said plunger passage to install fasteners received from said feed passage into said plunger passage; and
a proximity probe including a sensor in one of said side walls of said feed passage at an intersection with said plunger passage sensing a presence of a fastener in said plunger passage without said fastener contacting said sensor of said proximity probe.

13. The fastener installation apparatus as defined in claim 12, wherein said sensor includes an end portion adjacent to, but spaced from said plunger passage, whereby said fasteners do not contact said sensor.

14. The fastener installation apparatus as defined in claim 13, wherein said proximity probe is elongated having a longitudinal axis extending generally perpendicular to said feed passages and said plunger passages and an end portion adjacent to, but spaced from said plunger passage.

15. The fastener installation apparatus as defined in claim 14, wherein said proximity probe is connected by a line to a control, extending from said fastener installation apparatus generally perpendicular to said plunger passages.

* * * * *